United States Patent [19]

Karn

[11] 4,225,413
[45] Sep. 30, 1980

[54] SPIRAL WOUND ELECTRODIALYSIS CELL

[76] Inventor: William S. Karn, 518 Dickson Ave., Pittsburgh, Pa. 15202

[21] Appl. No.: 41,937

[22] Filed: May 24, 1979

[51] Int. Cl.² .............................................. B01D 13/02
[52] U.S. Cl. .................................. 204/301; 204/180 P
[58] Field of Search ............................ 204/301, 180 P

[56] References Cited

U.S. PATENT DOCUMENTS

| | | | |
|---|---|---|---|
| 2,741,595 | 4/1956 | Juda | 204/301 |
| 3,869,375 | 3/1975 | Ono et al. | 204/301 |

Primary Examiner—Arthur C. Prescott

[57] ABSTRACT

Two ion selective semipermeable membranes, such as are used in electrodialysis cell assemblies, are joined to one another at their edges so as to form a pouch with ion permeable walls. The membranes are provided with end flow ports into the pouch region. The pouch is wound into a spiral so as to resemble a spiral wound reverse osmosis module. A central hub electrode and a peripheral cylindrical electrode are provided. With suitable electrolyte streams the system operates as an electrodialysis cell assembly.

11 Claims, 4 Drawing Figures

FIGURE 1
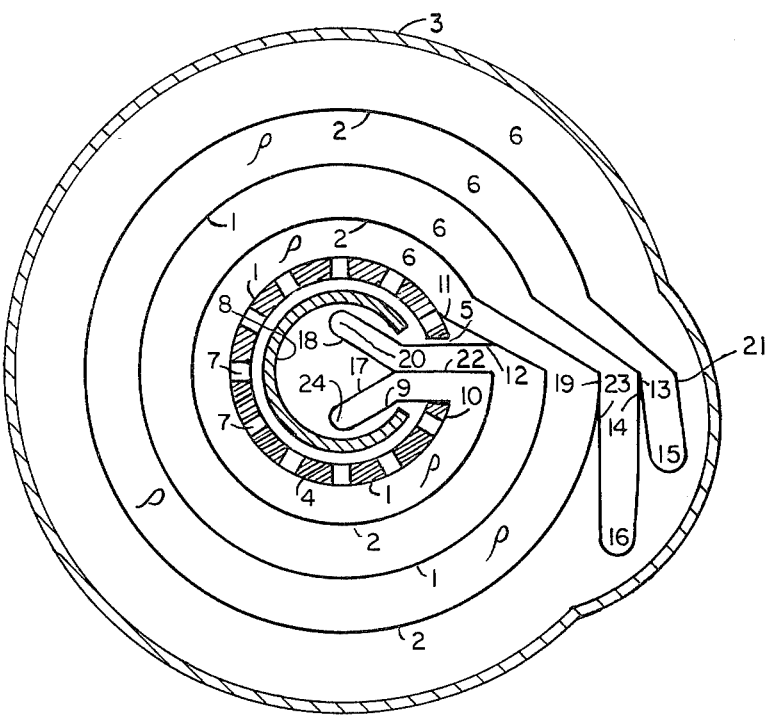
FIGURE 2
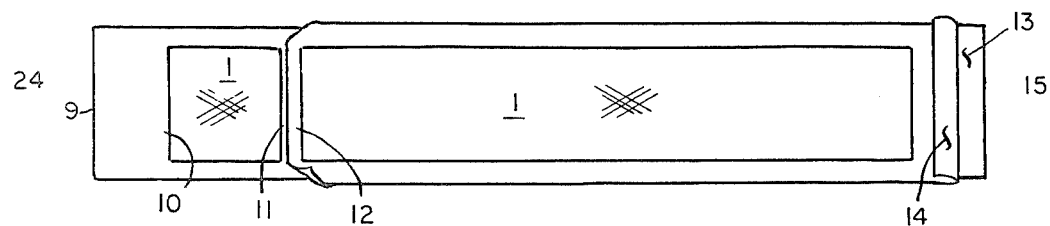
FIGURE 3
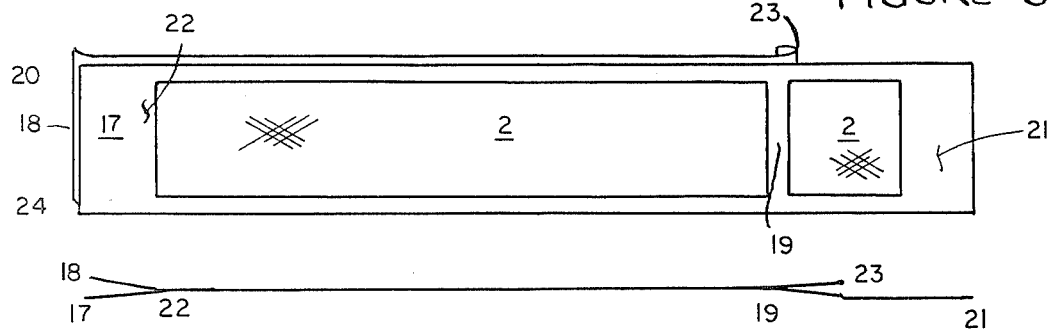
FIGURE 4

SPIRAL WOUND ELECTRODIALYSIS CELL

SUMMARY OF THE INVENTION

An object of this invention is to join ion permeable membranes into a flow system with a minimum number of flow branch ports that need to be attached to the flow system.

Another object of this invention is to provide an easy, convenient, leak free means for installing membranes in an electrodialysis cell array.

Another object of this invention is to provide means for pressurizing an electrodialysis cell array.

Another object is to reduce electrical current losses shunted thru the fluid flow manifold in an electrodialysis cell assembly.

BRIEF DESCRIPTION OF THE DRAWING

The figures of the drawing show membrane assembly configurations and component details.

FIG. 1 is a section view across the cylindrical axis of a spiral wound assembly of ion permeable membrane composites.

FIG. 2 is a flat view of one ion permeable membrane composite.

FIG. 3 is a flat view of a second membrane composite.

FIG. 4 is a section view on edge of FIG. 3 showing bi-leaf edge detail.

DETAILED DESCRIPTION OF THE INVENTION

The following U.S. Pat. Nos. and literature are cited as prior art having instruction pertinent to this invention: 4,111,659 Bowley; 3,616,927 Muir; 3,911,080 Mehl et alius; 3,614,856 Sanz et alius; 3,342,719 Chen et alius; 2,867,575 De Jong; 839,815 Decker; 2,741,591 Dewey et alius; 3,388,080 Korosy et alius; 4,057,481 Lee et alius; patent application Ser. No. 941,966 filed 9-13-78 by Karn; Trans. of Am. Soc. Art. Internal Organs, vol. 5, 1959, p. 148 Crescenzi et alii; Jagur-Grodzinski et alius in 4th International Symposium of Fresh Water from the Sea, volume 4, 171-180, 1973 "Ionically Charged Tubular Membranes for Water Softening and Desalination".

In the prior art electrodialysis membranes have been assembled in stacked flat sheets and clamped. Each membrane sheet comprises the wall of an electrolyte compartment. Each compartment requires a manifold flow entry port and an exit port. A port is generally of small diameter to reduce shunted electrical current losses.

In the prior art relating to reverse osmosis modules, membranes have been spiral wound to form effluent collecting pouches that communicate with an axial collecting pipe. This spiral wound or scroll configuration produces a high membrane area to volume ratio. Costs are reduced by reason of the easy replacement of membranes in permanent pressure vessels.

The references above of De Jong, Chen, and Karn give instruction concerning edge bonding together of membranes. Membrane bonding technique is an essential part of this invention.

The terminology "ion permeable membrane composite" is used in this patent application. The composite has an ion permeable region. The composite has a heat bondable or an adhesive bondable region. Because the membrane has both an ion permeable region and a bondable region it is in that sense a composite.

FIG. 4 shows one more essential membrane bonding feature. The edge of the membrane composite in the region to be bonded divides into two borders or margins or frames or edges. By that arrangement a membrane can be bonded to its one neighbor on one side and to its other neighbor on the other side. The sequence can be repeated without cummulative distortion. Each edge seal is accessible on both faces of the bonded surface for necessary clamping while bonding. See reference Ser. No. 941,966 Karn above for elaborating details.

In broad terms this invention deals with membrane separatory processes involving aqueous ionic systems and ion permeable membranes. In more specific terms the invention embraces equipment design for electrodialysis; water splitting with bipolar membranes; water softening with a single polarity membrane with a Donnan equilibrium mechanism with two dissimilar electrolyte streams; reverse osmosis; and ion separation by ion transport mobility differences.

The invention is an improved hardware design. Heat fusion bonding of the seams of all fluid carrying compartments is an important improvement in overcoming the many leaks that often plague equipment in these services. Even prior art reverse osmosis equipment did not have this desirable heat sealed feature as arranged in this invention.

As to electrodialysis equipment, the applicant believes that no prior art has employed the spiral wound or scroll configuration is such a design let alone heat fusion bond the membrane components hermetically into the assembly.

In the referenced U.S. Pat. No. 2,741,591 Dewey et alius their invention treats of aqueous system ion separatory technique based upon difference of transport numbers thru a single type of membrane by several different co-present ion species. Their FIG. 4A is especially notable for its having a central and a peripherial electrode. The patent is also notable in the detail that it does not teach how to close the edges of the membrane in the spiral so as to contain the flowing fluid in a passageway.

The operation of closing the edges of the spiral is no minor detail. The simple bolted flange and gasket system used with flat membranes is not appropriate for a spiral; nor does one simply fold each edge over upon its neighbor. Folding the edge simultaneously closes off the interior to a backup bucking tool necessary for pressing two surfaces together while cement bonding or fusion bonding the closure seam.

The Dewey invention does not involve two separate flow streams hydraulically sealed from one another throughout their entire length of passage thru the apparatus. An electrodialysis system has two streams. A water splitting apparatus has two streams. A Donnan equilibrium water softening system has two streams.

One may take the instruction of Dewey to insert an inner central electrode and an outer concentric electrode surrounding a spiral membrane. To that one may add the instruction of the current art of fabrication of spiral wound reverse osmosis modules to bond by adhesive two membranes into a pouch. To that combination one may add the instruction of the current art of electrodialysis to make the spiral wound adhesive bonded membrane pouch of one side cationic and of the other side anionic membrane material. By that combination one has the basic elements of this instant petition for an invention patent.

One reason that such an assembly was not built in the past may be that there are fluid leakage problems inherent in adhesive bonding membranes in such an array. Fusion bonding of the membranes is an excellent resolution of that problem. One may take the instruction of Chen and of DeJong (op. cit.) for fusion bonding the closure seams. This step of selecting fusion means requires one more step of invention.

Finally, if one take the instruction of the serial number 941,966 pending application of Karn, the most effective membrane film sealing techniques for this total array of equipment and a suitably flexible fusion sealable membrane material are disclosed. The putting together of all these detailed features is the basis of claims of this patent application. The resulting apparatus is a superior apparatus for electrodialysis cell assembly or for equilibrium exchange membrane assembly using the Donnan principle or for a water splitting cell assembly or for a spiral wound reverse osmosis module assembly or for separation of ions based upon ion transport mobility differences.

One special merit of the spiral wound design is that a single set of influent and effluent connectors serves to pass fluid across the entire active membrane surface. In other words, the flow system is a series flow system. That feature favors construction economy.

The spiral flow arrangement using two parallel paths is generally preferred for ease of fabrication and low electrical shunt loss. The spiral wound array can essentially eliminate electrical losses from electrical current bypassing thru an electrolyte fluid feeder manifold.

There are variations of the flow pattern that are still economical to fabricate by fusion bonding. An example is series flow in one stream with cross flow in the other stream. One stream follows the full length of the spiral of two membranes joined into a pouch. The other stream passes axially across the spiral wound cylindrical configuration. Also by heat fusion bonding a variety of manifolding patterns can be fabricated with thermoplastic borders that have not been converted to ionic membrane material.

This invention resembles the spiral wound reverse osmosis module in geometry. This resemblance then suggests that pressures may be applied to the equipment while it is operating as an electro-driven separatory machine. Specifically, if one is recovering sulfur dioxide from sodium bisulfite solution in a water splitting machine the application of pressure will prevent bubble formation within the cell stack thus avoiding interruption of the electrical circuit across the electrolyte conductor. There are other cases such as with dissolved ammonia or carbon dioxide for which this pressure capability will be useful.

The drawing does not explicitly present the spacers (region designated 6 in FIG. 1), but spacers are located between the membrane surfaces designated 1 and 2 in the drawing and also next to the electrodes. The outer electrode is designated 3 and the inner electrode is designated 8. A good separator choice is a cloth or mat of mixed ionic fiber as taught by prior art.

The inner core or mandrel (piece 4) on which the spiral is wound has a slot (region 5) to receive the wound membranes (1 and 2). The core (piece 4) is an electrical nonconductor such as polyvinylchloride pipe. The core (4) is perforated at regions marked 7 or the core is porous to allow electrical flow by ion migration. The electric current is between central electrode (piece 8) and surface of membrane 1 at its last exposed surface in the spiral near core perforations 7.

A careful study of FIGS. 1, 2, and 3 with a tracing of the path of the membranes from the core outward will show the sealing requirements across the membrane composites. In FIGS. 2 and 3 the regions marked 1 and 2 are active ion permeable regions. All other regions are inert wall regions or sealed seam regions. Starting with membrane composite of FIG. 2 at point 9 the border material passes thru central electrode 8 and thru hub 4 to region 10 where active ion permeable material 1 commences. Material 1 winds around the hub until reaching point 11 where a bi-leaf edge at point 12 splits off to reenter the hub. Continuing outward along the spiral the material 1 reaches another bi-leaf edge with branches designated 13 and 14. Starting in the center again with the membrane composite of FIG. 3 the inert bi-leaf edges designated 17 and 18 pass thru the central electrode 8 and thru the hub 4 to join together at region 22, which region joins active ion permeable material designated 2. Material 2 spirals outward until reaching 19 and 23 where bi-leaf edge 23 splits off to form a peripherial port 16. Permeable membrane material from 19 continues one more spiral turn to reach region 21 to form a second peripherial port 15. Back in the core the end leaves 12 and 18 are joined to form port designated 20, and end leaves 9 and 17 are joined to form port designated 24. The rest of the membrane peripheries are closed with one another by their adjacent bi-leaf edges.

The regions between two membranes marked with the Greek letter rho when joined at the edges are a pouch with ports 15 and 24. The other spiral chamber terminates at ports 16 and 20. If the edges of this chamber are left open, cross flow feed can be used for this electrolyte stream. Such a flow pattern should be considered for streams that tend to cause fouling.

Suitable composite membrane materials for construction are as taught in Karn patent application Ser. No. 941,966 and other references cited therein (e.g. Chen and Lee, op. cit.). Although the seams can be adhesive bonded together, fusion heat sealing is preferred. The most convenient port attachment methods are as taught in the Karn application cited.

Formed plastic spacers between the membranes are suitable spacers. A felted mat or woven cloth of synthetic mixed ion fiber is a good spacer material also. The mixed ion feature reduces electrolyte resistance loss as taught by others.

Suitable electrode materials are any electron conductors such as steel, stainless steel, lead, carbon rod, etc. The core mandrel piece 4 can be any of a variety of plastic pipe materials or other nonconductors.

The drawing for clarity shows only a few turns of membrane in the spiral with wide spacing. Commercial practice will favor spacings less than 0.1 inch and upward of 20 or more spiral layers.

In summary the design is economical to fabricate and efficient in operation.

I claim:

1. An assembly of two ion permeable membrane composites, each of said composites having an integral margin frame boundary region completely bordering the ion permeable region of said membrane composite, said integral margin frame boundary region having flow port connectors giving fluid access to faces of said membranes, said flow port connectors being joined to and passing thru said boundary region, said boundary region of one membrane composite being joined to the boundary region of a second membrane composite so as to form a closed pouch with openings only via said flow port connectors, said pouch being spiral wound about itself wherein the improvement comprises that said boundary region is a thermoplastic film material, that said boundary region is heat sealed to said flow port connectors, and that said boundary region is heat sealed to said second membrane composite boundary region completely around the periphery of said membrane composites.

2. An assembly of two ion permeable membrane composites, each of said composites having an integral margin frame boundary region completely bordering the ion permeable region of said membrane composite, and said integral margin frame boundary region having flow port connectors giving fluid access to faces of said membranes, said flow port connectors being joined to and passing thru said boundary region, said boundary region of one membrane composite being joined to the boundary region of a second membrane composite so as to form a closed pouch with openings only via said flow port connectors, said pouch being spiral wound about itself becoming thus a spiral wound assembly, said spiral wound assembly having an electrode in its central core region and having an electrode in its peripherial cylindrical region wherein the improvement comprises that said boundary region is a thermoplastic film material, that said boundary region is heat sealed to said flow port connectors, and that said boundary region is heat sealed to said second membrane composite boundary region completely around the periphery of said membrane composites.

3. The assembly of claim 1 wherein said integral margin frame boundary region of said spiral wound assembly is joined to the boundary region of said second membrane composite so as to form a second closed pouch having membrane walls in common with first said closed pouch within the spiral configuration, said second closed pouch having flow port connectors giving fluid access to faces of said membranes wherein the improvement comprises that said boundary region is a thermoplastic film material, that said boundary region is heat sealed to said second membrane composite boundary region completely around the periphery of said membrane composites, that successive turns in said spiral wound assembly are so joined so as to make, when viewed in cross section, a multiple layer of stacked compartments, and that each of said compartments within said multiple layer of spiral stacked compartments has its ion permeable walls shared in common with its neighboring compartment.

4. The assembly of claim 2 wherein said integral margin frame boundary region of said spiral wound assembly is joined to the boundary region of said second membrane composite so as to form a second closed pouch having membrane walls in common with first said closed pouch within the spiral configuration, said second closed pouch having flow port connectors giving fluid access to faces of said membranes wherein the improvement comprises that said boundary region is a thermoplastic film material, that said boundary region is heat sealed to said second membrane composite boundary region completely around the periphery of said membrane composites, that successive turns in said spiral wound assembly are so joined so as to make, when viewed in cross section, a multiple layer of stacked compartments, and that each of said compartments within said multiple layer of spiral stacked compartments has its ion permeable walls shared in common with its neighboring compartment.

5. The assembly of claim 1 wherein said assembly is within a pressure confining vessel.

6. The assembly of claim 2 wherein said assembly is within a pressure confining vessel.

7. The assembly of claim 2 wherein said ion permeable membranes are of such membrane polarity as to allow said assembly to function as an electrodialysis apparatus.

8. The assembly of claim 3 wherein the improvement comprises that, of said composites of two ion permeable membrane composites, each composite has two integral margin frame boundary regions completely bordering two ion permeable regions of said membrane composites, the two integral margin frames and the two ion permeable regions being such as to provide a heat bondable and a heat bonded seal line and to provide an ion permeable window path necessary for ion movement in operating said second closed pouch within said spiral wound assembly.

9. The assembly of claim 4 wherein the improvement comprises that, of said composites of two ion permeable membrane composites, each composite has two integral margin frame boundary regions completely bordering two ion permeable regions of said membrane composites, the two integral margin frames and the two ion permeable regions being such as to provide a heat bondable and a heat bonded seal line and to provide an ion permeable window path necessary for ion movement in operating said second closed pouch within said spiral wound assembly.

10. The assembly of claim 3 wherein the improvement comprises that said assembly is formed from an ion permeable membrane composite having an ion permeable region and having an ion impermeable region, said ion permeable membrane composite having two integral margin frame boundary regions of thermoplastic film comprising said ion impermeable region, each of said integral margin frame boundary regions completely bordering said ion permeable region of said membrane composite with such geometry that said composite, if viewed in any cross section cut perpendicular to the plane of the membrane fully across any portion of said ion permeable region and with a continuing of the cut fully across any portion of said two integral margin frame boundary regions along any cross section plane fully traversing said ion permeable membrane composite, would present a view of a central ion permeable region integrally bounded on each edge individually and jointly by said two thermoplastic film integral margin frame boundary regions.

11. The assembly of claim 4 wherein the improvement comprises that said assembly is formed from an ion permeable membrane composite having an ion permeable region and having an ion impermeable region, said ion permeable membrane composite having two integral margin frame boundary regions of thermoplastic film comprising said ion impermeable region, each of said integral margin frame boundary regions completely bordering said ion permeable region of said membrane composite with such geometry that said composite, if viewed in any cross section cut perpendicular to the plane of the membrane fully across any portion of said ion permeable region and with a continuing of the cut fully across any portion of said two integral margin frame boundary regions along any cross section plane fully traversing said ion permeable membrane composite, would present a view of a central ion permeable region integrally bounded on each edge individually and jointly by said two thermoplastic film integral margin frame boundary regions.

* * * * *